United States Patent [19]
Van Der Veken

[11] Patent Number: 5,429,480
[45] Date of Patent: Jul. 4, 1995

[54] WIND-ENGINE

[75] Inventor: Germaine Van Der Veken, Zurich, Switzerland

[73] Assignee: Gemaro A.G., Zurich, Switzerland

[21] Appl. No.: 176,082

[22] Filed: Dec. 30, 1993

[30] Foreign Application Priority Data

Dec. 30, 1992 [CH] Switzerland .............. 3992/92

[51] Int. Cl.⁶ .............. F03D 1/02; F03D 11/04
[52] U.S. Cl. .............. 416/120; 416/DIG. 6; 415/60
[58] Field of Search .............. 416/120, 121, DIG. 6, 416/9, 197 A; 415/4.3, 4.5, 60, 908

[56] References Cited

U.S. PATENT DOCUMENTS

| | | | |
|---|---|---|---|
| 1,718,682 | 6/1929 | Bruce | 416/DIG. 6 |
| 2,169,165 | 8/1939 | Reedy | 416/121 A |
| 4,184,084 | 1/1980 | Crehore | 416/121 A |
| 4,245,958 | 1/1981 | Ewers | 416/DIG. 6 |
| 4,321,005 | 3/1982 | Black | 416/197 A |
| 4,382,191 | 5/1983 | Potter | 416/197 A |
| 4,786,235 | 11/1988 | Van der Veken | 416/DIG. 6 |

FOREIGN PATENT DOCUMENTS

| | | | |
|---|---|---|---|
| 2541734 | 8/1984 | France | 416/197 A |
| 02411/86-1 | 6/1986 | Switzerland | 416/DIG. 6 |

Primary Examiner—Edward K. Look
Assistant Examiner—James A. Larson
Attorney, Agent, or Firm—Bacon & Thomas

[57] ABSTRACT

Improved wind-engine, comprising a frame (1) and several wind devices (2) mounted on different stages, one above the other on transversal parts (4) of this frame (1) with at least one separation wall (5, 6) mounted on the frame (1), between the wind devices (2) situated one above the other.

11 Claims, 1 Drawing Sheet

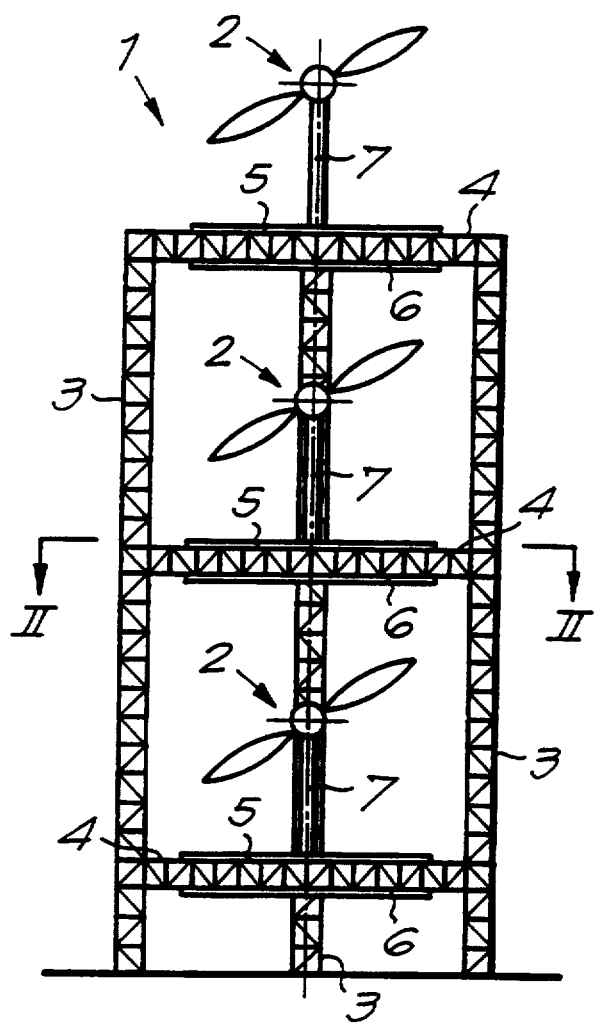
Fig.1
Fig.2
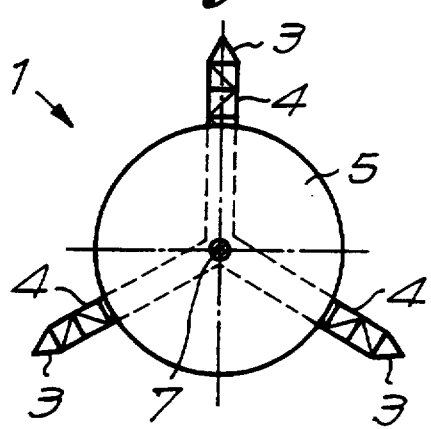
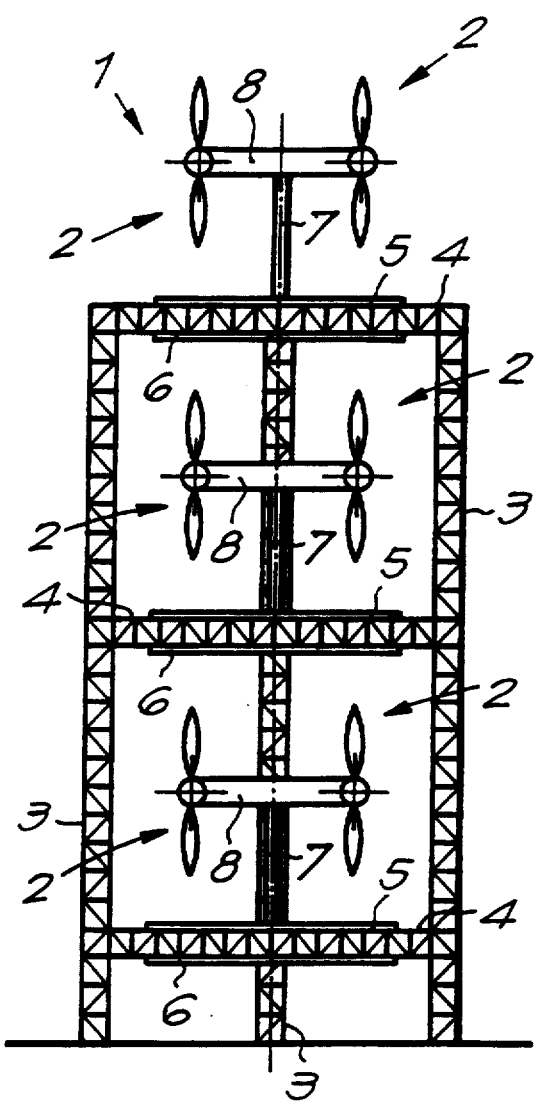
Fig.3

WIND-ENGINE

BACKGROUND OF THE INVENTION

1. Field of Invention

The invention relates to an improved wind-engine, comprising a frame and several wind devices mounted on different stages on transversal parts of this frame and therefore situated one above the other.

2. Discussion of the Prior Art

Wind-engines comprising several wind devices mounted at different stages are disclosed in CH-A-668 623 and CH-A-669 640 in the name of the applicant.

In these engines there is no separation of the air reaching the wind devices at different stages, so that the rotation of a wind device on one stage can influence the air currents reaching the wind devices situated on a higher or lower stage.

Moreover, the transversal parts of the frame on which the wind devices are mounted and which are located between two superposed wind devices can cause air perturbations and have a negative effect on the good working of these wind devices.

SUMMARY OF THE INVENTION

The invention aims at coping with these difficulties and providing an improved wind-engine in which the mutual influence of the wind devices on superposed stages and the influence of the transversal parts situated between these wind devices is reduced.

To this end, the engine comprises at least one separation wall mounted on the frame between the wind devices situated one above the other.

In an embodiment of the invention, the engine comprises individual wind devices on superposed stages and at least one separation wall between two wind devices which are located one above the other.

The engine can comprise one single wind device situated at the center of each stage and therefore at least one separation wall also at the center between the superposed wind devices.

In an other embodiment of the invention, the engine comprises groups of wind devices at superposed stages and at least one separation wall between the groups of wind devices located one above the other.

In a preferred embodiment, the wind devices are mounted above a transversal part of the frame and the engine comprises two separation walls between wind devices located one above the other, one of these walls being located above the transversal part, the other one underneath.

Especially in this embodiment, the influence of the transversal part on the air currents is limited.

This embodiment is especially useful in case the transversal part is formed by one or more trellis beams.

BRIEF DESCRIPTION OF THE DRAWINGS

In order to better show the characteristics of the invention, some preferred embodiments are described hereafter, as examples without any limitative character, reference being made to the accompanying drawings, in which:

FIG. 1 is a front view of an improved wind-engine according to the invention;

FIG. 2 represents a cross-section along line II—II in FIG. 1;

FIG. 3 is a front view similar to that of FIG. 1, but concerning an other embodiment of the engine according to the invention.

DETAILED DESCRIPTION OF THE PREFERRED EMBODIMENT

As represented in the figures, the wind-engine according to the invention essentially comprises a frame 1 in the form of a pole and wind devices 2 mounted on different stages, that is one above the other, on the frame.

This frame 1 in the form of a pole is made up of a number of pillars 3, preferably formed of trellis beams, and by horizontal transversal parts 4, also preferably formed of trellis beams, and attached to the pillars 3. In the engines represented in the figures, the frame comprises three pillars 3 and, at different stages, three horizontal transversal beams 4 which meet at the center and bear one or more wind devices 2.

In the embodiment represented in FIGS. 1 and 2, the engine only comprises one single wind device 2 at each stage, mounted on the transversal beams 4 by means of a vertical axis 7, at the place where they meet, that is in the middle.

Between two superposed wind devices 2, two parallel separation walls 5 and 6 are mounted on the transversal beams 4. The separation wall 5 is mounted on the upper side of the transversal beams 4 bearing the upper wind device 2, the separation wall 6 being mounted on the lower side of these transversal beams 4. These walls 5 and 6, extending horizontally, efficiently have the form of round discs. The vertical axis 7 of the upper wind device 2 can be mounted directly on the upper wall 5 or can go through this wall and can be mounted directly on the transversal beams 4.

Normally, the wind device 2 is mounted rotatably on the vertical axis 7 so that it can be positioned with respect to the wind.

The embodiment represented in FIG. 3 only differs from that described above in that the engine comprises, instead of one single wind device 2 per stage, a group of wind devices 2. This group consists of a vertical axis 7 on which horizontal bearing elements 8 are mounted, which themselves bear, in any way, the wind devices 2. These bearing elements 8 are normally mounted rotatably on the vertical axis 7, so that the wind devices 2 can be positioned with respect to the wind.

In a way entirely similar to that of the first embodiment, two separation walls 5 and 6 are mounted in the middle on the transversal beams 4 between two superposed groups of wind devices.

Due to the separation walls 5 and 6, the air arriving at the height of two superposed stages of the engine is divided in two. Thus, the rotation of a wind device 2 or of a group of wind devices 2 of one stage does not influence the current or flux which reaches the wind device 2 or group of wind devices 2 of a higher or lower stage. Moreover, possible turbulences caused by the transversal parts 4 are caught between the walls 5 and 6 without reaching the wind devices 2.

The diameter of the separation walls 5 and 6 is chosen in such a way that an optimal effect is obtained. This diameter can be equal to or different from that of the blades of the wind devices 2.

It is possible to mount similar walls in a similar way to the transversal beams 4 supporting the bottommost wind device 2 or the bottommost group of wind devices 2 or on possible transversal parts located just above the uppermost wind device 2 or the uppermost group of wind devices 2.

I claim:

1. A wind-engine comprising:
   a frame including a plurality of upstanding pillars that are interconnected by a plurality of vertically spaced and transversely extending parts;
   a plurality of wind devices, each of said plurality of wind devices having an associated horizontal axis of rotation;
   means for mounting said plurality of wind devices to said frame for rotation about their respective horizontal axes in various vertical stages, said various vertical stages being defined between respective ones of said plurality of vertically spaced and transversely extending pans; and
   at least one separation wall mounted on said frame vertically between two of said plurality of wind devices.

2. The wind-engine according to claim 1, wherein said plurality of vertically spaced and transversely extending parts includes at least first, second and third parts and said plurality of wind devices includes at least first and second wind devices, said first wind device being situated between said first and second parts and said second wind device being positioned between said second and third parts, said at least one separation wall being disposed vertically between said first and second wind devices.

3. The wind-engine according to claim 2, wherein said first wind device is situated centrally between said first and second parts and said second wind device is situated centrally between said second and third parts.

4. The wind-engine according to claim 3, wherein said at least one separation wall is centrally carried by said second part.

5. The wind-engine according to claim 1, wherein a single one of said plurality of wind devices is situated in each of said various vertical stages.

6. The wind-engine according to claim 1, wherein at least one of said plurality of vertically spaced and transversely extending parts has two separation walls mounted thereto with one of said two separation walls being mounted above said at least one part and the other of said separation walls being mounted below said at least one part.

7. The wind-engine according to claim 1, wherein groups of said plurality of wind devices are mounted in each of said various vertical stages.

8. The wind-engine according to claim 7, wherein at least one of said plurality of vertically spaced and transversely extending parts has two separation walls mounted thereto with one of said two separation walls being mounted above said at least one part and the other of said separation walls being mounted below said at least one part.

9. The wind-engine according to claim 1, wherein said plurality of vertically spaced and transversely extending parts are constituted by trellis beams.

10. The wind-engine according to claim 1, wherein said at least one separation wall constitutes a plate.

11. The wind-engine according to claim 10, wherein said plate constitutes a disc.

* * * * *